United States Patent [19]
Tsuji et al.

[11] Patent Number: 5,430,703
[45] Date of Patent: Jul. 4, 1995

[54] TRACK JUMP PREDICTION CONTROL OF MEMORY MODE

[75] Inventors: Shigeki Tsuji; Yukihiko Haikawa; Yukiharu Hosono, all of Higashihiroshima, Japan

[73] Assignee: Sharp Kabushiki Kaisha, Osaka, Japan

[21] Appl. No.: 72,453

[22] Filed: Jun. 7, 1993

[30] Foreign Application Priority Data

Jun. 11, 1992 [JP] Japan .................. 4-152180

[51] Int. Cl.⁶ .............................................. G11B 7/00
[52] U.S. Cl. ........................................ 369/60; 369/53; 369/44.27; 369/44.32
[58] Field of Search ............... 369/60, 59, 48, 58, 369/54, 53, 47, 32, 44.27–44.29, 44.26, 44.32, 50

[56] References Cited

U.S. PATENT DOCUMENTS

| | | | |
|---|---|---|---|
| 4,536,864 | 8/1985 | Van Rosmalen | 369/60 |
| 5,199,019 | 3/1993 | Matsumura et al. | 369/60 |
| 5,243,588 | 9/1993 | Maeda et al. | 369/60 |
| 5,291,468 | 3/1994 | Carmon et al. | 369/60 |

FOREIGN PATENT DOCUMENTS

| | | |
|---|---|---|
| 0465053A2 | 1/1992 | European Pat. Off. . |
| 3-34156 | 2/1991 | Japan . |
| 3-40269 | 2/1991 | Japan . |

*Primary Examiner*—Georgia Y. Epps
*Assistant Examiner*—Nabil Hindi
*Attorney, Agent, or Firm*—Nixon & Vanderhye

[57] ABSTRACT

Audio sound data (compressed data) read by an optical pickup is temporarily held in a memory and the audio sound data is expanded to be returned to its original size. At the time of usual reproduction, since the difference in data transfer rates of reading by optical pickup and data expansion is absorbed, writing and reading of audio sound data are alternately performed using part of the memory capacity, while audio sound data is held by a fixed amount for data protection upon impact occurrence utilizing the remaining memory capacity. At the time of track jump, for example, if the moving distance of a head is long, all the memory capacity is used for data protection. If the moving distance of the head is short, part of the memory capacity is allocated according to the moving time, and the remaining memory capacity is used for data protection upon impact occurrence.

5 Claims, 4 Drawing Sheets

| MUSIC NO. | START ADDRESS | | | END ADDRESS | | |
|---|---|---|---|---|---|---|
| | CLUSTER | SECTOR | SOUND GROUP | CLUSTER | SECTOR | SOUND GROUP |
| 1 | 00 | 00 | 00 | 02 | 16 | 02 |
| 2 | 05 | 17 | 08 | 09 | 21 | 09 |
| 3 | 15 | 30 | 03 | 19 | 02 | 01 |
| 4 | 37 | 21 | 08 | 45 | 12 | 04 |
| 5 | ⋮ | ⋮ | ⋮ | ⋮ | ⋮ | ⋮ |

TRACK JUMP PREDICTION CONTROL OF MEMORY MODE

BACKGROUND OF THE INVENTION

1. Field of the Invention

The present invention relates generally to digital information reproducing apparatuses such as optical disk apparatuses, and more specifically, to a digital information reproducing apparatus for returning compressed digital information to its original size for reproduction.

2. Description of the Background Art

An apparatus having a function of reproducing compressed stored data such as mini disk apparatus includes a circuit for performing an expansion processing to return compressed data to its original size at the time of reproduction. The circuit performs such an expansion processing at a speed lower than reading of compressed data by the head. Therefore, a semiconductor memory for absorbing the difference in the data transfer rates is provided between the head and the circuit for performing expansion processing in the above-described apparatus.

A mini disk apparatus is for example provided with a DRAM as semiconductor memory, and part of the memory capacity of the DRAM is allocated for absorbing the difference in the data transfer rates at the time of reproduction. The remaining memory capacity of the DRAM is allocated for data protection at the time of disturbance such as oscillation or when a track jump for moving the head to a target track is performed. Therefore, if data reading is temporarily stopped for such an oscillation or track jump, data is held in the DRAM for a certain period of time taking advantage of the difference in the data transfer rates. Accordingly, if the head becomes ready for normal data reading during this period, reproduction will not be interrupted.

In a conventional mini disk apparatus, a semiconductor memory is utilized both for absorbing the difference in the data transfer rates and for data protection. If the moving distance of the head is prolonged when it performs a track jump, time required for the moving is prolonged as well, and sufficient memory capacity for data protection can not be secured in some cases. In order to normally reproduce data at the time of track jump, a series of search operations for moving the optical pickup to a target track and causing emitted light to follow the track must be performed at a high speed.

In order to perform the search operations at a high speed, circuitry of control system such as a servo circuit must be designed to increase the speed of optical pickup feeding control or the like, which was not easy to achieve. Also for high speed searching operations, the driving system must supply an increased amount of electric power, and power consumption increases as a result.

SUMMARY OF THE INVENTION

It is therefore an object of the invention to simplify the control circuit of a data reading apparatus including a head, in a digital information reproducing apparatus having a semiconductor memory.

Another object of the invention is to reduce power consumption generated by the movement of a data reading apparatus including a head, in a digital information reproducing apparatus having a semiconductor memory.

Yet another object of the invention is to change the use of a semiconductor memory depending upon use modes, in a digital information reproducing apparatus having a semiconductor memory.

The above-described objects of the invention are achieved by a digital information reproducing apparatus including the following elements. More specifically, the digital information reproducing apparatus according to the invention includes a head reading compressed digital data from a storage medium, a semiconductor memory for temporarily holding the compressed data read by the head, an expander for expanding the compressed data held at the memory at a speed lower than the reading speed of the compressed data by the head, a memory management unit for allocating the memory for absorbing the difference between the reading speed of the compressed data by the head and the above-described expansion processing speed by the expander, and for protecting the compressed data upon an occurrence of a disturbance at the time of normal reproduction, a movement prediction unit for predicting the movement of the head to another region on the storage medium, and a controller controlling the memory management unit to use all the memory capacity of the semiconductor memory for protecting the compressed data at the time of movement of said head, when the above-described prediction unit predicts a movement of the head.

Since the digital information reproducing apparatus includes the above-described elements, when a movement of a head to another region on the storage medium is predicted by the prediction unit, all the memory capacity of the semiconductor memory is allocated by the memory management unit for compressed data protection at the time of the movement before head actually moves.

Thus, the amount of compressed data which can be held can be maximized in the range of the memory capacity, and the moving time of head can be prolonged. If the moving distance of head is further prolonged, thus prolonging the moving time period, so that the moving speed of the reader can be reduced. As a result, the design of control system circuitry of the reader including the head can be simplified as well as power consumption can be reduced.

The foregoing and other objects, features, aspects and advantages of the present invention will become more apparent from the following detailed description of the present invention when taken in conjunction with the accompanying drawings.

DESCRIPTION OF THE PREFERRED EMBODIMENTS

Figure 1:
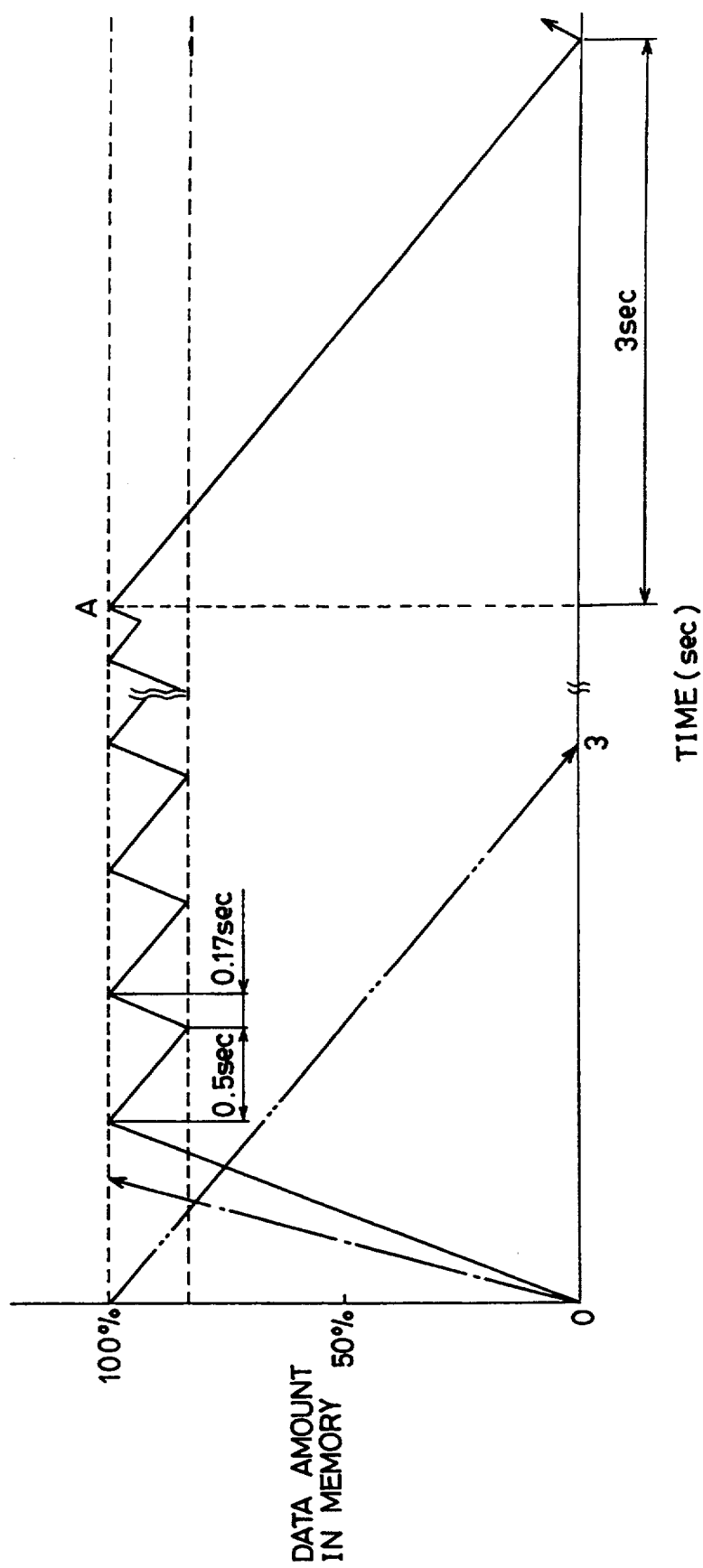
FIG. 1 is a graphic representation showing change in the amount of data in a shock proof memory in a mini disk apparatus according to one embodiment of the invention.

Now, an application of a mini disk according to one embodiment of the invention will be described in conjunction with FIGS. 1 and 2.

A mini disk apparatus according to the embodiment reproduces audio sound data compressed, then modulated and stored on a storage medium. The mini disk apparatus includes, as illustrated in FIG. 2, an optical pickup 1, an RF amplifier 2, a decoder/signal processing circuit 3, a memory controller 4, a shock proof memory 5, a data expansion circuit 6, a feed motor 8, a spindle motor 9, a servo circuit 11, a drive circuit 10, and a system controller 12.

Optical pickup 1 is a head irradiating a disk 13 storage medium with light and picking up light reflected from disk 13, and reads an RF signal (modulated audio sound data) stored in disk 13 at a rate of 1.4M bits per second. RF amplifier 2 amplifies the RF signal read by optical pickup 1. Decoder/signal processing circuit 3 can communicate with system controller 12 to perform a processing of TOC (Table of Contents) or the like. Decoder/signal processing circuit 3 demodulates the RF signal via the RF amplifier 2 and converts the signal into audio sound data, and performs a prescribed processing such as mistake correction or the like to the audio sound data.

Figures 3, 4:
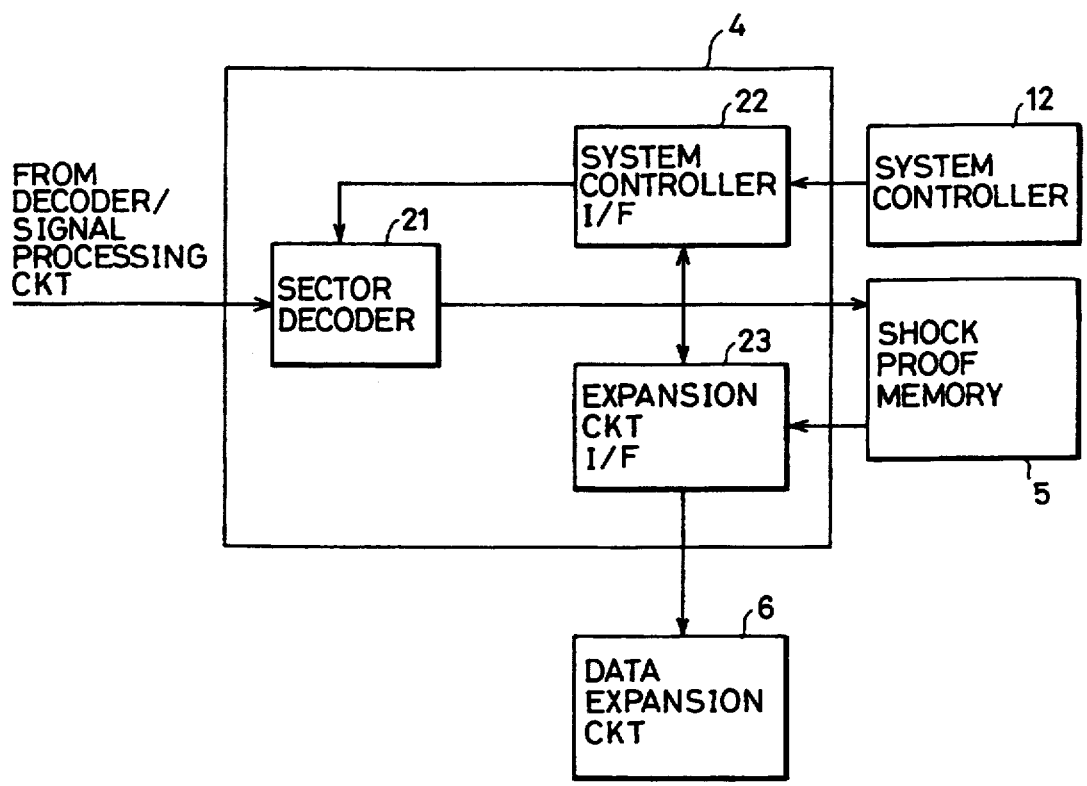
FIG. 3 is a block diagram showing the content of a memory controller.
FIG. 4 is a table showing the content of TOC.

FIG. 3 is a block diagram showing the structure of memory controller 4. Referring to FIG. 3, memory controller 4 includes a sector decoder 21 for decoding audio sound data from decoder/signal processing circuit 3, a system controller I/F 22 connected to sector decoder 21 for receiving a control signal from system controller 12, a shock proof memory 5, and an expansion circuit I/F 23 connected to data expansion circuit 6 for transferring compressed data stored in shock proof memory 5 to data expansion circuit 6.

Memory controller 4 controls writing and reading of data to shock proof memory 5 in response to an instruction from system controller 12, so that the audio sound data via decoder/signal processing circuit 3 is held in shock proof memory 5. Memory controller 4 transfers the audio sound data output from decoder/signal processing circuit 3 to shock proof memory 5 and transfers the audio sound data output from shock proof memory 5 to data expansion circuit 6.

Shock proof memory 5 is a semiconductor memory for temporarily holding the audio sound data output from decoder/signal processing circuit 3, and a 1M bit DRAM is, for example, used for the memory. Shock proof memory 5 is provided between decoder/signal processing circuit 3 and data expansion circuit 6. Shock proof memory 5 is provided for the purpose of absorbing the difference between the transfer rates of the audio sound data output from decoder/signal processing circuit 3 and the transfer rate of the audio sound data input to data expansion circuit 6 as well as for protecting audio sound data to prevent an interruption of reproduction due to disturbance such as oscillation. Shock proof memory 5 is so controlled that writing is completed for about 0.7 second at a data transfer rate at the input side and audio sound data filling the memory is read out for about three seconds at a data transfer rate on the output side.

Figure 2:
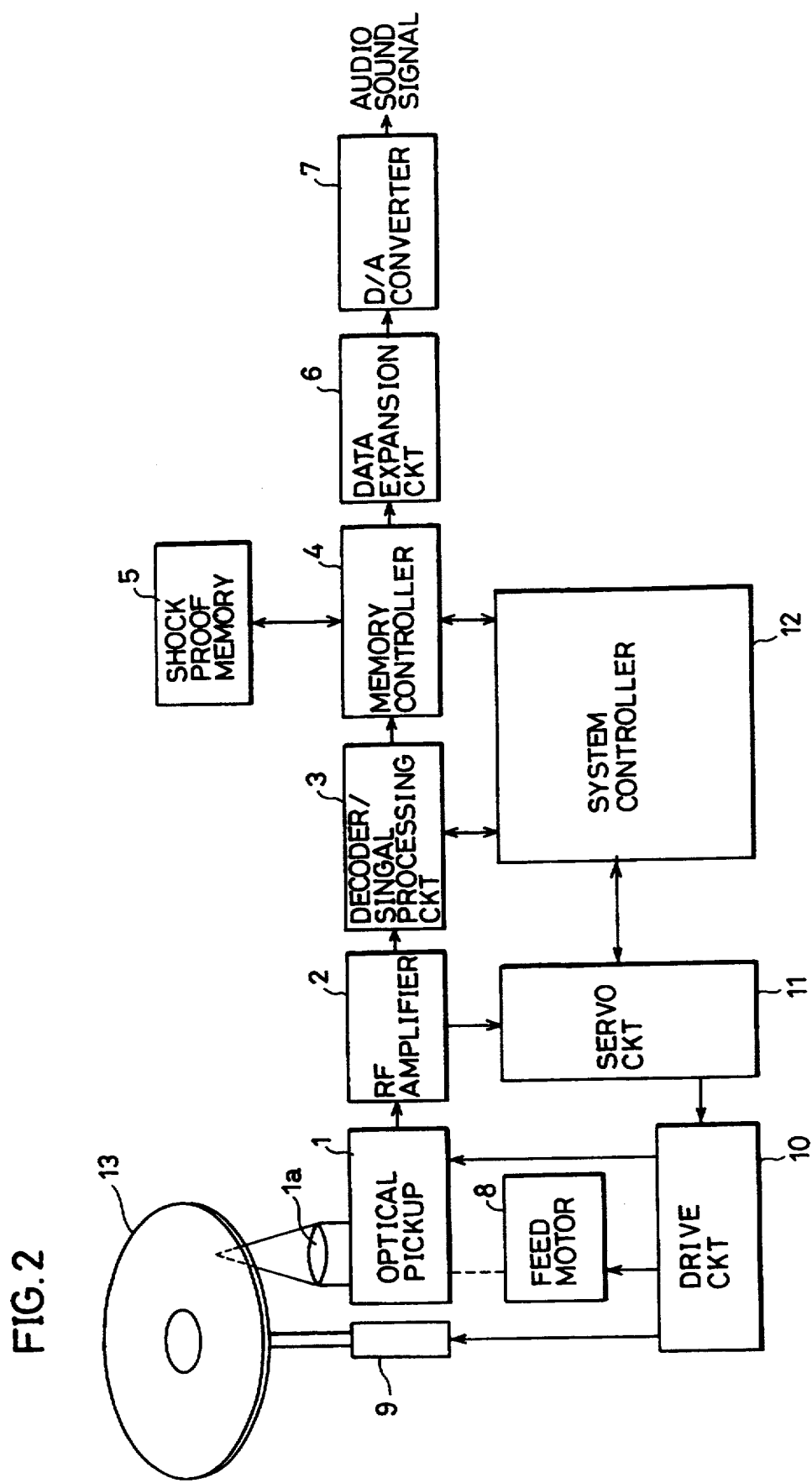
FIG. 2 is a block diagram schematically showing the structure of a mini disk apparatus.

Shock proof memory 5 operates in one second or shorter when only writing audio sound data as indicated by the chain dotted line in FIG. 1, while it operates in about three seconds when only reading audio sound data as indicated by the chain double dotted line in FIG. 1. More specifically, shock proof memory 5 is cable of holding audio sound data for about three seconds.

Data expansion circuit 6 is a circuit for expanding and returning the audio sound data compressed according to the ATRAC (Adaptive Transform Acoustic Coding) method to its original size, and performs a data expansion processing at a rate of 0.3M bit per second. D/A converter 7 converts the audio sound data output from data expansion circuit 6 into analog data.

Feed motor 8 is a motor for moving optical pickup 1 to a direction perpendicular to the track of disk 13. Spindle motor 9 is a motor for rotating disk 13. Drive circuit 10 is a circuit for supplying power to feed motor 8, spindle motor 9, and a driving apparatus for driving objective lens 1a of optical pickup 1 to operate them.

Servo circuit 11 is a feed back control circuit for controlling the above-described respective elements driven by drive circuit 10 so that operation such as causing light emitted from optical pickup 1 to follow a target track is accurately performed. Servo circuit 11 determines the amount of control based on the output of RF amplifier 2 in response to an instruction from system controller 12, and the amount of control is transmitted to drive circuit 10 in the form of a control signal.

System controller 12 is a microcomputer for centralized control of decoder/signal processing circuit 3, memory controller 4, and servo circuit 11.

System controller 12 is capable of predicting a track jump by which optical pickup 1 moves to target track jumping over a plurality of tracks.

Now, prediction of a track jump will be described.

FIG. 4 is a simplified table showing the content of the TOC stored at the head of the mini desk. Referring to the TOC information, the continuity of data in the disk is known. In the example shown in FIG. 4, since pieces of music are apart on the disk, a search operation and a track jump are necessary between pieces. The fact that a music piece is recorded separately on the disk is also recorded in the TOC information.

System controller 12, upon recognizing an execution of track jump, calculates the moving distance of optical pickup 1 by the TOC information, and calculates time necessary for optical pickup 1 to move based on the moving distance.

More specifically, if an address difference necessary for the movement is produced from the TOC information, a moving distance on the disk is known. Since the relation between moving distance and search time is previously stored in system controller 12, system controller 12 can calculate the moving time.

Furthermore, system controller 12 can perform different controls between (1) usual reproduction and (2) track jump. Now, this will be described in detail. In the following, the memory capacity of shock proof memory 5 is represented in time calculated based on a transfer rate in reading.

(1) Usual Reproduction

The amount of 0.5 second out of the entire memory capacity of shock proof memory 5 corresponding to 3 seconds is allocated for absorbing a transfer rate difference in audio sound data on the input and output sides of shock proof memory (hereinafter referred simply as "transfer rate difference absorption"). Meanwhile, the amount of 2.5 seconds of the remaining memory capacity is allocated for protecting audio sound data when a track displacement is generated due to generation of an impact or the like (hereinafter simply referred to as "for data protection upon impact occurrence").

(2) Track Jump

In performing a track jump, if time since the initiation of movement to audio sound data being read out plus time for margin taking into account safety for the operation is in excess of three seconds (longest output time), the memory capacity is entirely allocated for data protection at the time of track jump. If the above-described total time is shorter than three seconds, the memory capacity corresponding to the total time is allocated for data protection at the time of track jump, and the remaining amount of memory capacity is allocated only for data protection upon impact occurrence.

System controller 12 controls shock proof memory 5 in the above-described manner at the time of track jump. System controller 12 may allocate all the memory capacity for data protection at the time of track jump irrespective of the above-described total time period.

Figure 5:
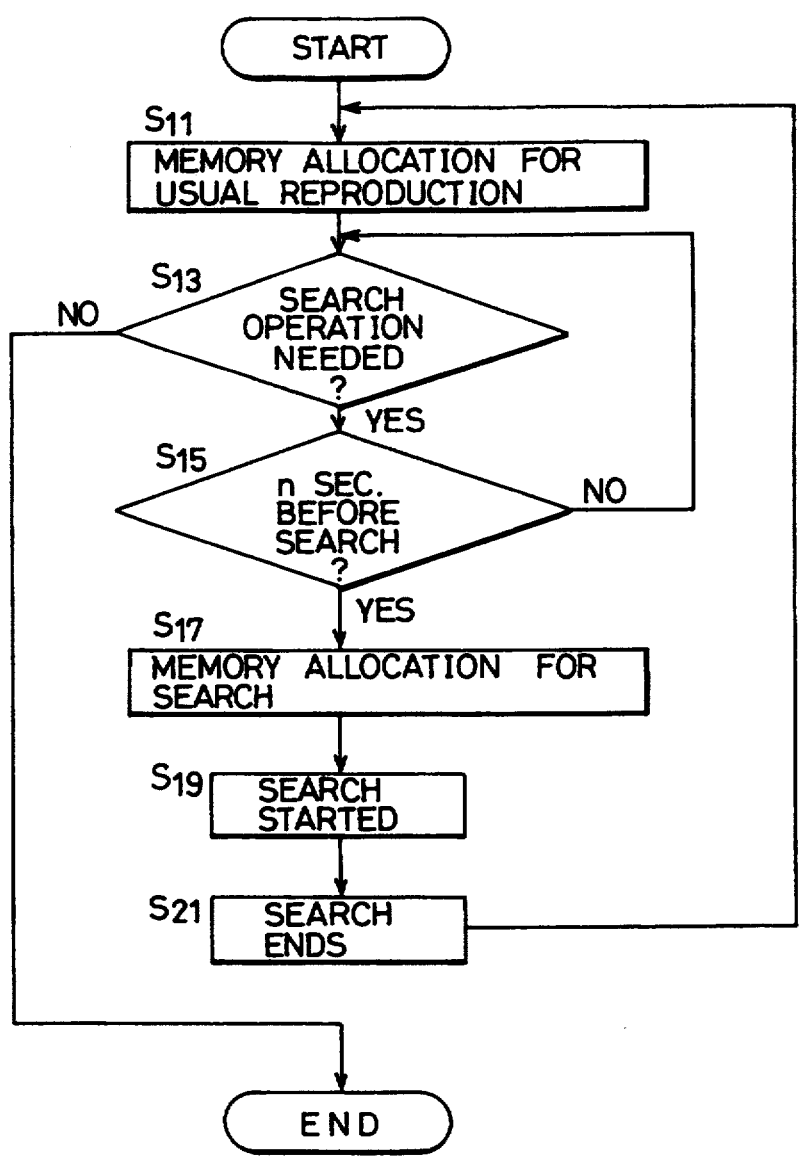
FIG. 5 is a flow chart for use in illustration of an operation of a memory controller.

Now, referring to FIG. 5, the operations of system controller 12 and memory controller 5 in actual operation will be described.

Initially, the memory capacity of shock proof memory 5 is allocated for usual operation as in the above-described (1) (S11).

If it is determined that a track jump is necessary, because successive audio sound such as music is separated and recorded at the inner and outer circumferences of disk 13 (YES in 13), system controller 12 recognizes that a track jump is going to be performed, time required for moving optical pickup 1 is calculated, and allocation of the memory capacity depending upon the time period is determined (S15, S17). Then, a track jump is performed (S19, S21).

Now, the specific operation of the mini disk apparatus to which the invention is applied and changes in the amount of data in the shock proof memory will be described.

Referring back to FIG. 2, an RF signal is read out from disk 13 by optical pickup 1. The RF signal is amplified at RF amplifier 2, then subjected to demodulation and a prescribed signal processing at decoder/signal processing circuit to be reproduced as audio sound data and transmitted to memory controller 4. At the time, the audio sound data is compressed data in a compressed state.

Meanwhile, the RF signal amplified at RF amplifier 2 is also transmitted to servo circuit 11 as a signal for feedback. Servo circuit 11 determines the amount of control based on the RF signal in response to an instruction from system controller 12, and outputs a control signal to drive circuit 10. Then, drive circuit 10 operates feed motor 8, spindle motor 9, and the driving apparatus of objective lens 1a depending upon the size of the control signal. Thus, optical pickup 1 is sent to a target track, the revolution of disk 13 is controlled at a target value, and objective lens 1a is driven to accurately follow the track. The audio sound data transmitted to memory controller 4 is written into shock proof memory 5 and temporarily held therein, and read out to memory controller 4 in the order they are written.

At the time, in usual reproducing, as indicated by the solid line in FIG. 1, if the audio sound data is written to fill the memory capacity, writing is stopped only for 0.4 sec, during which period reading is performed. More specifically, during this period, the audio sound data obtained by reading optical pickup 1 is not written in shock proof memory 5.

For 0.17 sec succeeding the above-described 0.5 sec, the audio sound obtained by reading by optical pickup 1 is written in shock proof memory 5. In usual reproduction, the period in which signal reading from optical pickup 1 is simultaneously performed with writing of audio sound data to shock proof memory 5 and the period in which only reading of audio sound data from shock proof memory 5 is performed are alternately repeated, and the audio sound data is always held by the remaining memory capacity corresponding to 2.5 seconds. Accordingly, if optical pickup 1 is temporarily shifted from a track which it is reading due to oscillation or the like, audio sound data will not suffer from sound dropouts if it returns to the original position within 2.5 seconds.

Now, changes in the amount of data in the shock proof memory when a track jump is performed will be described.

When all the memory capacity in other words the capacity corresponding to three seconds is allocated for data protection, as illustrated in solid line in FIG. 1, audio sound data is read out from point A at which audio sound data fills the memory capacity immediately before the initiation of the movement of optical pickup 1 under the control of system controller 12. Therefore, in this case, a search control by servo circuit 11 is performed so that the movement of optical pickup 1 to a target track is completed within three seconds.

If a time period shorter than the three seconds of the memory capacity is allocated for data protection at the time of track jump, audio sound data is held by the memory capacity corresponding to that time period for protection at the time of track jump, and the audio sound data is held in the remaining memory capacity for protection upon impact occurrence.

The audio sound output from memory controller 4 is transmitted to data expansion circuit 6, and returned to its original size. The audio sound data via data expansion circuit 6 is converted by D/A converter 7 into analog data, and output as an audio sound signal.

It is noted that in the present embodiment, the case in which the invention is applied to the mini disk apparatus has been described. But the invention is not limited thereto, and the invention has applicability to any apparatus holding audio sound data utilizing a semiconductor memory for data protection or the like, even if the apparatus utilize a magnetic tape for a recording medium. Further, the capacity of the shock proof memory is not limited to 1M bits.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. A digital information reproducing apparatus, comprising:

reading means for reading compressed digital data from a storage medium;

semiconductor memory means for temporarily holding the compressed data read by said reading means;

data expansion means for expanding the compressed data held in said semiconductor memory means at a rate lower than the reading rate of the compressed data by said reading means in usual expansion;

memory management means for allocating said semiconductor memory means for rate difference absorption for absorbing the difference between the reading rate of the compressed data by said reading means and said expansion processing rate of said data expansion means, and for compressed data protection when disturbance is generated;

movement prediction means for predicting that said reading means is to move to another region on said storage medium; and control means for controlling said memory management means to use the entire memory capacity of said semiconductor memory means for compressed data protection at the time of the movement of said reading means, if said prediction means predicts a movement of said reading means.

2. A digital information reproducing apparatus as recited in claim 1, wherein said storage medium includes storage means for storing data including the content of said storage medium and its address, and said prediction means predicts a movement of said reading means based on the data stored in said storage means.

3. A digital information reproducing apparatus, comprising:

reading means for reading compressed digital data from a storage medium;

semiconductor storage means for temporarily holding the compressed data read by said reading means;

data expansion means for expanding the compressed data held in said semiconductor memory means at a rate lower than the reading rate by said reading means;

memory management means for allocating said semiconductor memory for absorbing the difference between the reading rate of the compression data by said reading means and the expansion processing rate of the data expansion means at the time of usual reproduction, and for compressed data protection when an impact is effected;

movement prediction means for predicting a movement of said reading means to a target track and its moving distance;

movement time calculation means for calculating a time period necessary for the moving based on said moving distance;

calculation means for calculating the longest expansion time period for said data expansion means to expand all the data of said semiconductor memory means;

comparison means for comparing the moving time calculated by said moving time calculation means and the longest expansion time period; and control means responsive to the comparison result of said comparison means for controlling said memory management means to use all the storage capacity of said semiconductor memory in a first mode for protecting compressed data at the time of the movement of said reading means, when said moving time period is longer than said longest expansion time period, and to use the semiconductor memory device in said first mode and in a second mode for compressed data protection when an impact is effected.

4. A digital information reproducing apparatus as recited in claim 3, wherein said storage medium includes storage means for storing data including the content of said storage medium and its address, and said prediction means predicts a movement of said reading means based on the data stored in said storage means.

5. A digital information reproducing apparatus as recited in claim 3 comprising a mini disk reproducing apparatus.

* * * * *